United States
Tatian

[11] 3,778,133
[51] Dec. 11, 1973

[54] LENS SYSTEM HAVING AT LEAST ONE THIN, HIGHLY DEFORMED PLATE WITH ASPHERICAL SURFACES

[75] Inventor: Berge Tatian, Stoneham, Mass.

[73] Assignee: Itek Corporation, Lexington, Mass.

[22] Filed: July 26, 1972

[21] Appl. No.: 275,276

[52] U.S. Cl................ 350/2, 350/189, 350/192, 350/200
[51] Int. Cl...... G02b 3/04, G02b 9/12, G02b 13/14
[58] Field of Search................ 350/2, 189, 192, 350/200

[56] References Cited
UNITED STATES PATENTS

| | | |
|---|---|---|
| 2,510,521 | 6/1950 | Rinia................ 350/189 UX |
| 3,022,708 | 2/1962 | Baker................ 350/200 |
| 3,321,264 | 5/1967 | Sijgers et al. .......... 350/2 |
| 3,160,700 | 12/1964 | Snyder................ 350/2 X |

*Primary Examiner*—John K. Corbin
*Attorney*—Homer O. Blair et al.

[57] ABSTRACT

Four embodiments of fast (F/2 or faster), wide angle (70°), infrared lens systems are disclosed. Each of the lens systems is formed of a plurality of thin, highly deformed germanium plates. Each highly deformed plate has two, substantially parallel, highly deformed aspheric surfaces. The high index of refraction of germanium generates the power in each lens system despite the substantially parallel nature of the aspheric surfaces of each plate, and the aspheric surfaces are utilized for the correction of aberrations.

11 Claims, 4 Drawing Figures

LENS SYSTEM HAVING AT LEAST ONE THIN, HIGHLY DEFORMED PLATE WITH ASPHERICAL SURFACES

BACKGROUND OF THE INVENTION

The present invention relates generally to refractive optical systems, and more particularly pertains to a unique concept in lens system design which utilizes thin, highly deformed plates having highly deformed aspheric surfaces.

In the field of infrared lens systems, fields of view greater than 15 to 20° are virtually unknown. Further, infrared lens systems having even that limited field of view normally had to sacrifice lens speed to obtain that field of view.

The conventional and prior art practice in optical design and fabrication is to use spherical surfaces exclusively, or to make use of a small number (relative to the number of surfaces in the system) of surfaces which are not spherical. These non-spherical surfaces are almost always such that the departure of the surface from a spherical shape is small compared to the overall departure of the surface from a plane. The one exception to this in the prior art is the "Schmidt plate" in which an element of weak spherical power is placed at the aperture stop of the lens. This element usually has one flat surface and one largely aspheric surface, the latter being for the purpose of correcting the spherical aberration of the lens.

This invention departs from the prior art in that both surfaces of every element are highly aspheric. Further, the shapes of the two surfaces of each lens element are such that the surfaces are substantially parallel, making the element somewhat similar in appearance to a non-flat window, but having an asphericity such that the window departs noticeably from a spherical shape. Further, in spite of the roughly parallel shape of the surfaces of the lens elements, the index of the optical material of which the element is constructed is so high that the element has considerable optical power, either of the quadratic type for producing imaging power, or of a higher order type for the purpose of correcting aberrations, or both.

SUMMARY OF THE INVENTION

In accordance with four disclosed embodiments, a radically new approach to lens system design is disclosed. In the four disclosed embodiments this new design approach is utilized in the infrared region of the spectrum. However, it should be realized that the disclosed design approach is equally applicable to lens systems for use in other portions of the spectrum.

In accordance with the teachings of this invention, aberrations in a lens system are controlled by utilizing at least one thin, highly deformed plate having highly deformed aspheric surfaces. A highly deformed plate is defined as a plate having both surfaces sufficiently deformed from spherical shapes such that the departure of the two aspheric surfaces from spherical shapes is at least the same order of magnitude as the change in thickness between the largest thickness and the smallest thickness of the plate. Further, by utilizing deformed plates with a high index of refraction (generally two or above), the high index may be utilized to generate substantial optical power within the lens system despite the substantially parallel nature of the aspheric surfaces of each plate.

In accordance with the teachings of this invention, infrared lens systems have been designed by utilizing thin, highly deformed plates of germanium. These designed lens systems have speeds of F/2 or faster and fields of view greater than 30°. The high index of refraction of germanium generates optical power within each lens system despite the substantially parallel nature of each of the two aspheric surfaces of each plate, and the highly aspheric surfaces are utilized for the correction of aberrations in the lens systems.

DETAILED DESCRIPTION OF THE INVENTION

In accordance with the disclosed embodiments, a radically new approach to lens system design is taught herein. In accordance with the teachings of this invention, aberrations in a lens system are controlled by utilizing at least one thin, highly deformed plate having highly deformed aspheric surfaces. For explanatory purposes throughout this patent application, a highly deformed plate is defined as a plate having surfaces which are sufficiently deformed from spherical shapes that the departure of the two aspheric surfaces from shperical shapes is at least the same order of magnitude as the change in thickness between the largest thickness and the smallest thickness of the plate. Further, if the highly deformed plate has a high index of refraction, which for purposes of this patent application will be considered to be two or above, then the high index may be utilized to generate substantial optical power in the lens system despite the substantially parallel nature of the two aspheric surfaces of each plate.

Figure 1:
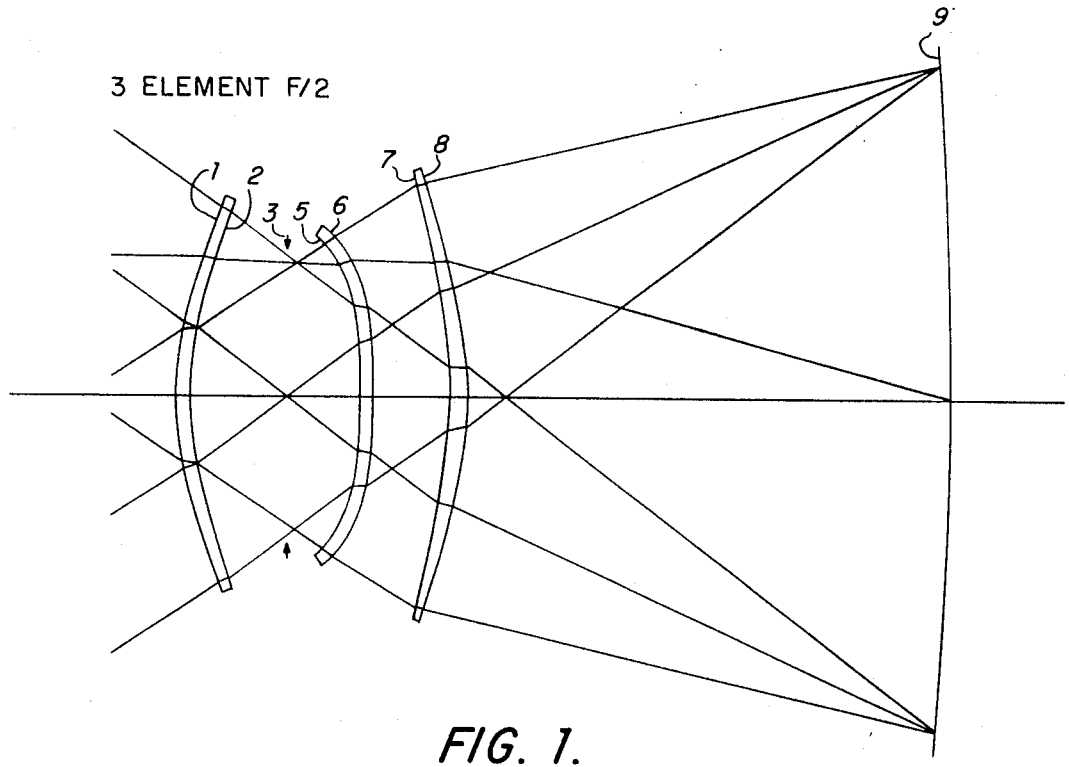
FIG. 1 is a reproduction of a computer printout on a three element, F/2, germanium lens system designed to operate in the infrared portion of the spectrum.
Figure 2:
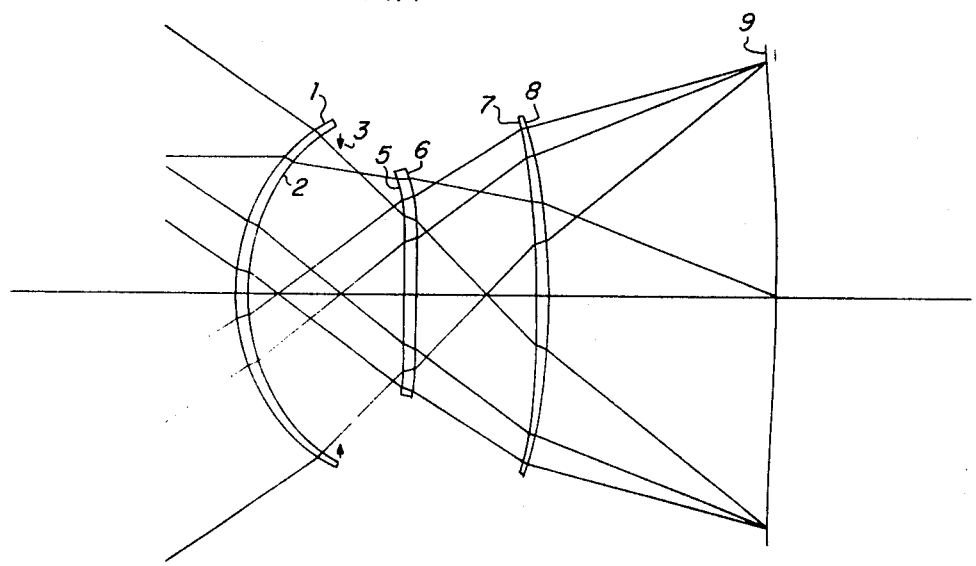
FIG. 2 is a reproduction of a computer printout on a three element, F/1.4, germanium lens system also designed to operate in the infrared portion of the spectrum.
Figure 3:
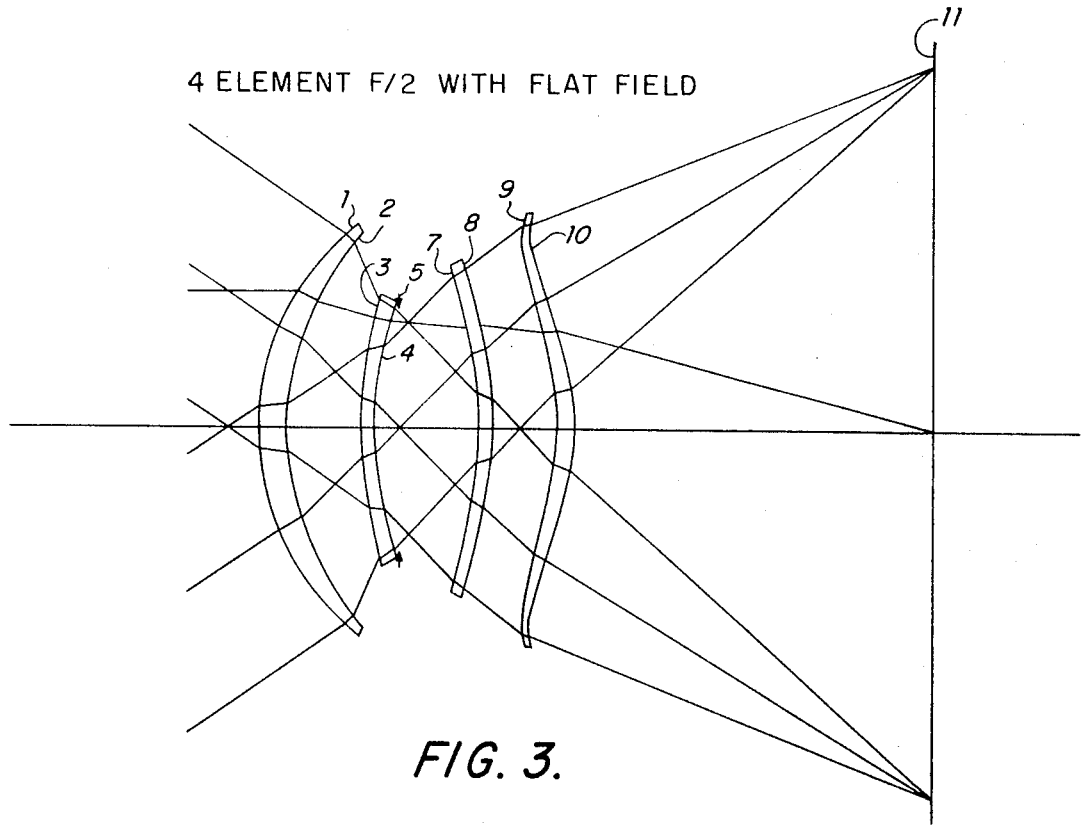
FIG. 3 is a reproduction of a computer printout on a four element, F/2, germanium lens system also designed for the infrared.
Figure 4:
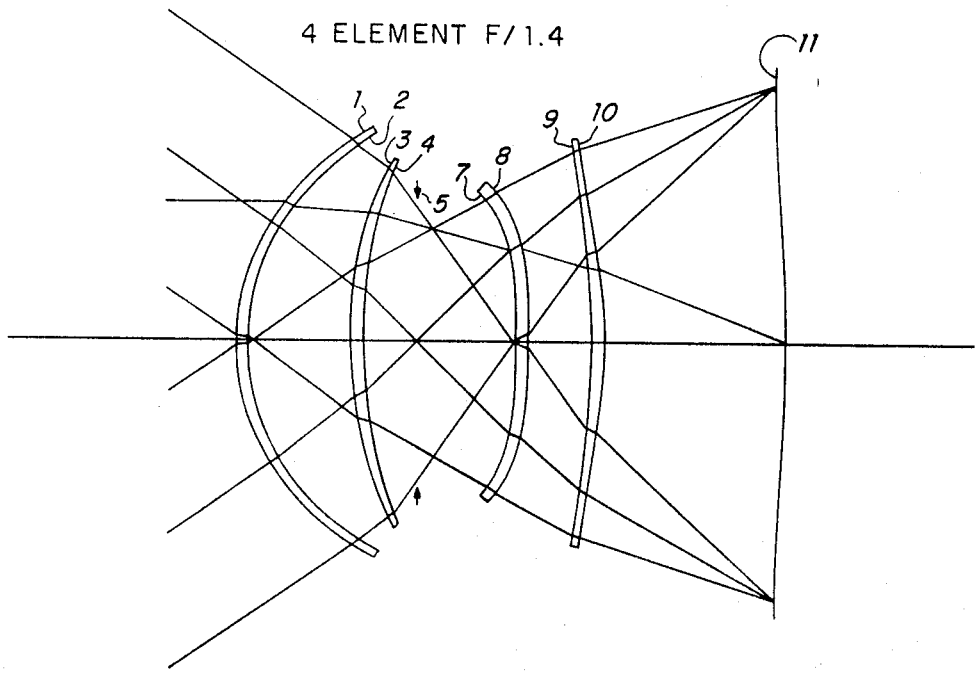
FIG. 4 is a reproduction of a computer printout on a four element, F/1.4, germanium lens system also designed for the infrared.

Each of the aspheric surfaces within each embodiment may be described by the following equation: $X = A1y^2$ (which defines a parabola) + (the following deformation terms) $A2y^4 + A3y^6 + A4y^8 + A5y^{10} + A6y^{12} + A7y^{14} + A8y^{16}$ wherein $x$ is the distance along the optical axis of the lens system, $y$ is the distance from the optical axis of the lens system, and the lens system is symmetrical about its optical axis. The polynomial coefficients for each surface of the lens system of FIG. 1 are found in Table 1, the polynomial coefficients for FIG. 2 are found in Table 2, and etc. for FIGS. 3 and 4, and Tables 3 and 4. In each listed polynomial coefficient, $E-n$ at the end of the coefficient stands for multiplication by the factor $10^{-n}$, n being the last named number in each line. Each table also lists the separations of the surfaces and the focal length of the lens system, with all measurements being given as ratios along the optical axis. The separations and focal lengths are all given as ratios as particular embodiments might be built to different scales as desired by the lens designer.

In the embodiments of FIGS. 1, 2, 3 and 4, the lens stops are defined respectively by points 3, 3, 5 and 5 in each lens sytem. The lens systems of FIGS. 1, 2 and 4 have curved focal planes while the lens system of FIG. 3 has a flat focal plane. Each of the lens systems is designed to operate in the infrared portion of the spectrum, and each of the lens system utilizes highly deformed plates of germanium, which has an index of refraction of 4.002. Although each of the four embodiments was designed while using germanium, other embodiments might also be designed while utilizing other infrared transmissive materials having high indices of refraction such as Silicon ($n = 3.42$), arsenic trisulphide ($n = 2.40$), chalcogenide glass ($n = 2.60$), selenium glass ($n = 2.48$), zinc sulphide ($n = 2.22$), etc.

TABLE 1

THREE ELEMENT F/2

FOCAL LENGTH — 29.96

| Separation of Surfaces | |
|---|---|
| 1 – 2 | 0.7500 |
| 2 – 3 | 5.4854 |
| 3 – 5 | 3.9398 |
| 5 – 6 | 0.7500 |
| 6 – 7 | 4.2987 |
| 7 – 8 | 1.0110 |
| 8 – 9 | 26.9731 |

| SURFACE 1 POLYNOMIAL COEFFICIENTS | |
|---|---|
| COEFFICIENT | VALUE |
| A1 | 0.284656E-01 |
| A2 | -0.106594E-04 |
| A3 | -0.383960E-06 |
| A4 | 0.596083E-10 |
| A5 | 0.149096E-11 |
| A6 | 0.387147E-13 |
| A7 | 0.331571E-15 |
| A8 | -0.475274E-17 |

| SURFACE 2 POLYNOMIAL COEFFICIENTS | |
|---|---|
| COEFFICIENT | VALUE |
| A1 | 0.283207E-01 |
| A2 | -0.144112E-04 |
| A3 | -0.458670E-06 |
| A4 | 0.349553E-09 |
| A5 | 0.406575E-11 |
| A6 | 0.710067E-13 |
| A7 | -0.279664E-15 |
| A8 | -0.316657E-17 |

| SURFACE 5 POLYNOMIAL COEFFICIENTS | |
|---|---|
| COEFFICIENT | VALUE |
| A1 | -0.680585E-02 |
| A2 | -0.240316E-03 |
| A3 | -0.106899E-05 |
| A4 | -0.278617E-08 |
| A5 | -0.277143E-10 |
| A6 | -0.254051E-12 |
| A7 | -0.587506E-14 |
| A8 | -0.150426E-16 |

| SURFACE 6 POLYNOMIAL COEFFICIENTS | |
|---|---|
| COEFFICIENT | VALUE |
| A1 | -0.714460E-02 |
| A2 | -0.224138E-03 |
| A3 | -0.838780E-06 |
| A4 | 0.244791E-08 |
| A5 | -0.692714E-10 |
| A6 | 0.302935E-12 |
| A7 | -0.392617E-14 |
| A8 | -0.100810E-16 |

| SURFACE 7 POLYNOMIAL COEFFICIENTS | |
|---|---|
| COEFFICIENT | VALUE |
| A1 | -0.183219E-01 |
| A2 | 0.435280E-05 |
| A3 | 0.239812E-06 |
| A4 | 0.276059E-09 |
| A5 | -0.501623E-11 |
| A6 | 0.334377E-13 |
| A7 | -0.491751E-16 |
| A8 | -0.580397E-18 |

| SURFACE 8 POLYNOMIAL COEFFICIENTS | |
|---|---|
| COEFFICIENT | VALUE |
| A1 | -0.224846E-01 |
| A2 | -0.135062E-05 |
| A3 | 0.196675E-06 |
| A4 | 0.805437E-09 |
| A5 | -0.697555E-11 |
| A6 | 0.393201E-13 |
| A7 | -0.326549E-16 |
| A8 | -0.719943E-18 |

| SURFACE 9 POLYNOMIAL COEFFICIENTS | |
|---|---|
| COEFFICIENT | VALUE |
| A1 | -0.392109E-02 |
| A2 | 0.769801E-05 |
| A3 | -0.611495E-08 |
| A4 | 0.533514E-11 |
| A5 | -0.208303E-13 |
| A6 | -0.180053E-24 |
| A7 | -0.103548E-28 |
| A8 | -0.662825E-33 |

TABLE 2

THREE ELEMENT F/1.4

FOCAL LENGTH – 21

| Separation of Surfaces | |
|---|---|
| 1 – 2 | .7000 |
| 2 – 3 | 5.1321 |
| 3 – 5 | 3.5488 |
| 5 – 6 | .7000 |
| 6 – 7 | 6.7095 |
| 7 – 8 | .7000 |
| 8 – 9 | 12.7939 |

| SURFACE 1 POLYNOMIAL COEFFICIENTS | |
|---|---|
| COEFFICIENT | VALUE |
| A1 | 0.411090E-01 |
| A2 | 0.884367E-04 |
| A3 | 0.155710E-05 |
| A4 | -0.155574E-07 |
| A5 | 0.200970E-09 |
| A6 | -0.165759E-12 |
| A7 | 0.396938E-15 |
| A8 | 0.228560E-16 |

| SURFACE 2 POLYNOMIAL COEFFICIENTS | |
|---|---|
| COEFFICIENT | VALUE |
| A1 | 0.399009E-01 |
| A2 | 0.929605E-04 |

|  |  |
|---|---|
| A3 | 0.164568E-05 |
| A4 | -0.125073E-07 |
| A5 | 0.595141E-10 |
| A6 | 0.204541E-11 |
| A7 | -0.200361E-14 |
| A8 | -0.837223E-16 |

SURFACE 5 POLYNOMIAL COEFFICIENTS

| COEFFICIENT | VALUE |
|---|---|
| A1 | 0.356314E-02 |
| A2 | -0.199684E-03 |
| A3 | -0.232003E-05 |
| A4 | -0.132235E-07 |
| A5 | 0.121303E-09 |
| A6 | -0.211221E-11 |
| A7 | 0.113899E-13 |
| A8 | 0.267223E-15 |

SURFACE 6 POLYNOMIAL COEFFICIENTS

| COEFFICIENT | VALUE |
|---|---|
| A1 | 0.143849E-02 |
| A2 | -0.195107E-03 |
| A3 | -0.200231E-05 |
| A4 | -0.147829E-07 |
| A5 | 0.343119E-09 |
| A6 | -0.296525E-11 |
| A7 | -0.334305E-14 |
| A8 | 0.276317E-15 |

SURFACE 7 POLYNOMIAL COEFFICIENTS

| COEFFICIENT | VALUE |
|---|---|
| A1 | -0.569086E-02 |
| A2 | -0.195660E-05 |
| A3 | -0.213327E-06 |
| A4 | -0.679279E-08 |
| A5 | 0.487378E-10 |
| A6 | -0.834506E-13 |
| A7 | 0.303122E-16 |
| A8 | 0.362109E-18 |

SURFACE 8 POLYNOMIAL COEFFICIENTS

| COEFFICIENT | VALUE |
|---|---|
| A1 | -0.110872E-01 |
| A2 | -0.187462E-05 |
| A3 | -0.785190E-07 |
| A4 | -0.977145E-08 |
| A5 | 0.899649E-10 |
| A6 | -0.420130E-12 |
| A7 | 0.972552E-15 |
| A8 | 0.554971E-18 |

SURFACE 9 POLYNOMIAL COEFFICIENTS

| COEFFICIENT | VALUE |
|---|---|
| A1 | -0.702481E-02 |
| A2 | 0.232735E-04 |
| A3 | 0.114231E-06 |
| A4 | -0.116914E-08 |
| A5 | 0.243000E-11 |
| A6 | -0.119558E-21 |
| A7 | -0.224327E-25 |
| A8 | -0.461293E-29 |

TABLE 3

FOUR ELEMENT F/2
FOCAL LENGTH – 29.96

| Separation of Surfaces |  |
|---|---|
| 1 - 2 | 1.4988 |
| 2 - 3 | 4.1988 |
| 3 - 4 | .7500 |
| 4 - 5 | 1.4082 |
| 5 - 7 | 4.3556 |
| 7 - 8 | .7500 |
| 8 - 9 | 3.6340 |
| 9 - 10 | .9284 |
| 10 - 11 | 20.2337 |

SURFACE 1 POLYNOMIAL COEFFICIENTS

| COEFFICIENT | VALUE |
|---|---|
| A1 | 0.355365E-01 |
| A2 | 0.420445E-04 |
| A3 | 0.168923E-06 |
| A4 | -0.286201E-09 |
| A5 | 0.645338E-12 |
| A6 | 0.378137E-13 |
| A7 | -0.119481E-15 |
| A8 | 0.780458E-19 |

SURFACE 2 POLYNOMIAL COEFFICIENTS

| COEFFICIENT | VALUE |
|---|---|
| A1 | 0.341975E-01 |
| A2 | 0.257645E-04 |
| A3 | 0.930704E-07 |
| A4 | -0.139757E-08 |
| A5 | -0.117934E-11 |
| A6 | 0.581170E-13 |
| A7 | -0.163186E-15 |
| A8 | 0.234293E-19 |

SURFACE 3 POLYNOMIAL COEFFICIENTS

| COEFFICIENT | VALUE |
|---|---|
| A1 | 0.255292E-01 |
| A2 | -0.171074E-03 |
| A3 | 0.569596E-06 |
| A4 | 0.255640E-08 |
| A5 | 0.355440E-09 |
| A6 | -0.283933E-11 |
| A7 | -0.262940E-14 |
| A8 | -0.621752E-25 |

SURFACE 4 POLYNOMIAL COEFFICIENTS

| COEFFICIENT | VALUE |
|---|---|
| A1 | 0.287570E-01 |
| A2 | -0.157728E-03 |
| A3 | 0.125510E-05 |
| A4 | -0.375666E-08 |
| A5 | 0.576370E-09 |
| A6 | -0.429021E-11 |
| A7 | 0.106100E-13 |
| A8 | 0.208415E-21 |

SURFACE 7 POLYNOMIAL COEFFICIENTS

| COEFFICIENT | VALUE |
|---|---|
| A1 | -0.252638E-01 |
| A2 | 0.162717E-04 |
| A3 | 0.163854E-05 |
| A4 | 0.247747E-08 |
| A5 | -0.159428E-09 |
| A6 | -0.582616E-12 |
| A7 | 0.673413E-14 |
| A8 | -0.174029E-21 |

SURFACE 8 POLYNOMIAL COEFFICIENTS

| COEFFICIENT | VALUE |
|---|---|
| A1 | -0.263793E-01 |
| A2 | 0.276853E-04 |
| A3 | 0.135613E-05 |
| A4 | 0.401450E-08 |

| | |
|---|---|
| A5 | -0.130612E-09 |
| A6 | -0.100572E-11 |
| A7 | 0.818610E-14 |
| A8 | -0.305970E-22 |

SURFACE 9 POLYNOMIAL COEFFICIENTS

| COEFFICIENT | VALUE |
|---|---|
| A1 | -0.299933E-01 |
| A2 | 0.671354E-04 |
| A3 | 0.337496E-06 |
| A4 | 0.197999E-09 |
| A5 | -0.657601E-11 |
| A6 | 0.880695E-13 |
| A7 | -0.698222E-16 |
| A8 | -0.487924E-21 |

SURFACE 10 POLYNOMIAL COEFFICIENTS

| COEFFICIENT | VALUE |
|---|---|
| A1 | -0.320354E-01 |
| A2 | 0.377797E-04 |
| A3 | 0.253731E-06 |
| A4 | 0.112947E-08 |
| A5 | -0.678897E-11 |
| A6 | 0.111059E-12 |
| A7 | -0.952922E-16 |
| A8 | -0.243308E-19 |

TABLE 4

FOUR ELEMENT F/1.4
FOCAL LENGTH - 21

| Separation of Surfaces | |
|---|---|
| 1 - 2 | .7000 |
| 2 - 3 | 5.6652 |
| 3 - 4 | .7000 |
| 4 - 5 | 3.0212 |
| 5 - 7 | 5.4229 |
| 7 - 8 | .7000 |
| 8 - 9 | 3.6422 |
| 9 - 10 | .7000 |
| 10 - 11 | 10.1289 |

SURFACE 1 POLYNOMIAL COEFFICIENTS

| COEFFICIENT | VALUE |
|---|---|
| A1 | 0.377556E-01 |
| A2 | 0.711727E-04 |
| A3 | 0.280455E-06 |
| A4 | 0.149597E-08 |
| A5 | 0.962967E-12 |
| A6 | 0.521991E-16 |
| A7 | 0.828657E-19 |
| A8 | 0.136033E-21 |

SURFACE 2 POLYNOMIAL COEFFICIENTS

| COEFFICIENT | VALUE |
|---|---|
| A1 | 0.374387E-01 |
| A2 | 0.781662E-04 |
| A3 | 0.349475E-06 |
| A4 | 0.173574E-08 |
| A5 | 0.159310E-11 |
| A6 | 0.623530E-15 |
| A7 | 0.162835E-17 |
| A8 | 0.439743E-20 |

SURFACE 3 POLYNOMIAL COEFFICIENTS

| COEFFICIENT | VALUE |
|---|---|
| A1 | 0.183013E-01 |
| A2 | 0.307204E-04 |
| A3 | 0.357654E-06 |
| A4 | 0.896277E-09 |
| A5 | -0.642890E-11 |
| A6 | 0.366249E-17 |
| A7 | 0.395015E-20 |
| A8 | 0.440564E-23 |

SURFACE 4 POLYNOMIAL COEFFICIENTS

| COEFFICIENT | VALUE |
|---|---|
| A1 | 0.147581E-01 |
| A2 | 0.255754E-04 |
| A3 | 0.383079E-06 |
| A4 | 0.303876E-09 |
| A5 | -0.784487E-11 |
| A6 | 0.374745E-19 |
| A7 | 0.168747E-22 |
| A8 | 0.785769E-26 |

SURFACE 7 POLYNOMIAL COEFFICIENTS

| COEFFICIENT | VALUE |
|---|---|
| A1 | -0.320269E-02 |
| A2 | -0.297869E-03 |
| A3 | -0.697876E-06 |
| A4 | -0.184290E-07 |
| A5 | 0.439903E-11 |
| A6 | -0.541794E-20 |
| A7 | -0.221678E-23 |
| A8 | -0.937927E-27 |

SURFACE 8 POLYNOMIAL COEFFICIENTS

| COEFFICIENT | VALUE |
|---|---|
| A1 | -0.405323E-02 |
| A2 | -0.282454E-03 |
| A3 | -0.528827E-06 |
| A4 | -0.970396E-08 |
| A5 | 0.703710E-11 |
| A6 | 0.163886E-19 |
| A7 | -0.801069E-23 |
| A8 | 0.404909E-26 |

SURFACE 9 POLYNOMIAL COEFFICIENTS

| COEFFICIENT | VALUE |
|---|---|
| A1 | -0.115893E-01 |
| A2 | -0.201608E-04 |
| A3 | 0.386288E-06 |
| A4 | -0.400963E-09 |
| A5 | -0.193264E-11 |
| A6 | -0.734308E-18 |
| A7 | -0.629236E-21 |
| A8 | -0.557581E-24 |

SURFACE 10 POLYNOMIAL COEFFICIENTS

| COEFFICIENT | VALUE |
|---|---|
| A1 | -0.160620E-01 |
| A2 | -0.144057E-04 |
| A3 | 0.407039E-06 |
| A4 | -0.475656E-09 |
| A5 | -0.157049E-11 |
| A6 | -0.142395E-21 |
| A7 | -0.206846E-25 |
| A8 | -0.310714E-29 |

SURFACE 11 POLYNOMIAL COEFFICIENTS

| COEFFICIENT | VALUE |
|---|---|
| A1 | -0.738193E-02 |
| A2 | 0.369482E-04 |
| A3 | -0.124971E-06 |

| | |
|---|---|
| A4 | 0.240754E-09 |
| A5 | -0.877590E-18 |
| A6 | -0.142271E-21 |
| A7 | -0.241626E-25 |
| A8 | -0.424356E-29 |

While several embodiments have been described, the teachings of this invention will suggest many other embodiments to those skilled in the art.

I claim:

1. In a refractive lens system having an optical axis and also having aberrations, the improvement comprising a means for correcting the aberrations and including at least one thin, highly deformed plate in the lens system for the correction of aberrations, said thin, highly deformed plate having two aspheric surfaces wherein each ashperic surface is described by the following equation: $X = A1y^2 + A2y^4 + A3y^6 + A4y^8 + A5y^{10} + A6y^{12} + A7y^{14} + A8y^{16}$ wherein $An$ are polyinominal coefficients, $X$ is the distance along the optical axis of the lens system, $y$ is the distance from the optical axis of the lens system, and the lens system is symmetrical about its optical axis and in which the departure of the two aspheric surfaces from spherical shapes is at least the same order of magnitude as the change in thickness between the largest thickness and the smallest thickness of said thin, highly deformed plate.

2. A lens system as set forth in claim 1 and specifically designed for the infrared portion of the spectrum, having a speed of F/2 or faster, having a field of view of greater than 30°, and comprising: a plurality of thin, highly deformed plates, each said plate having an index of refraction of two or greater and each said plate having two aspheric surfaces in which the departure of the two aspheric surfaces from spherical shapes is at least the same order of magnitude as the change in thickness between the largest thickness and the smallest thickness of the plate.

3. A lens system as set forth in claim 2 wherein each of said thin, highly deformed plates is formed of germanium.

4. A lens system as set forth in claim 2 and having substantially the characteristics set forth below:

THREE ELEMENT F/2

FOCAL LENGTH — 29.96

Separation of Surfaces

| | |
|---|---|
| 1 - 2 | 0.7500 |
| 2 - 3 | 5.4854 |
| 3 - 5 | 3.9398 |
| 5 - 6 | 0.7500 |
| 6 - 7 | 4.2987 |
| 7 - 8 | 1.0110 |
| 8 - 9 | 26.9731 |

SURFACE 1 POLYNOMIAL COEFFICIENTS

| COEFFICIENT | VALUE |
|---|---|
| A1 | 0.284656E-01 |
| A2 | -0.106594E-04 |
| A3 | -0.383960E-06 |
| A4 | 0.596083E-10 |
| A5 | 0.149096E-11 |
| A6 | 0.387147E-13 |
| A7 | 0.331571E-15 |
| A8 | -0.475274E-17 |

SURFACE 2 POLYNOMIAL COEFFICIENTS

| COEFFICIENT | VALUE |
|---|---|
| A1 | 0.283207E-01 |
| A2 | -0.144112E-04 |
| A3 | -0.458670E-06 |
| A4 | 0.3495553E-09 |
| A5 | 0.4065775E-11 |
| A6 | 0.710067E-13 |
| A7 | -0.279664E-15 |
| A8 | -0.316657E-17 |

SURFACE 5 POLYNOMIAL COEFFICIENTS

| COEFFICIENT | VALUE |
|---|---|
| A1 | -0.680585E-02 |
| A2 | -0.240318E-03 |
| A3 | -0.0106899E-05 |
| A4 | -0.278617E-08 |
| A5 | -0.277143E-10 |
| A6 | -0.254051E-12 |
| A7 | -0.587506E-14 |
| A8 | -0.150428E-16 |

SURFACE 6 POLYNOMIAL COEFFICIENTS

| COEFFICIENT | VALUE |
|---|---|
| A1 | -0.714460E-02 |
| A2 | -0.224138E-03 |
| A3 | -0.838780E-06 |
| A4 | 0.244971E-08 |
| A5 | -0.692714E-10 |
| A6 | 0.302935E-12 |
| A7 | -0.392617E-14 |
| A8 | -0.100810E-16 |

SURFACE 7 POLYNOMIAL COEFFICIENTS

| COEFFICIENT | VALUE |
|---|---|
| A1 | -0.183219E-01 |
| A2 | 0.435280E-05 |
| A3 | 0.239812E-06 |
| A4 | 0.276059E-09 |
| A5 | -0.501623E-11 |
| A6 | 0.334377E-13 |
| A7 | -0.491751E-16 |
| A8 | -0.580397E-18 |

SURFACE 8 POLYNOMIAL COEFFICIENTS

| COEFFICIENT | VALUE |
|---|---|
| A1 | -0.224846E-01 |
| A2 | -0.135062E-05 |
| A3 | 0.196675E-06 |
| A4 | 0.805437E-09 |
| A5 | -0.697555E-11 |
| A6 | 0.393201E-13 |
| A7 | -0.326549E-16 |
| A8 | -0.719943E-18 |

SURFACE 9 POLYNOMIAL COEFFICIENTS

| COEFFICIENT | VALUE |
|---|---|
| A1 | -0.392109E-02 |
| A2 | 0.769801E-05 |
| A3 | -0.611495E-08 |
| A4 | 0.533514E-11 |
| A5 | -0.208303E-13 |
| A6 | -0.180053E-24 |
| A7 | -0.103548E-28 |
| A8 | -0.662825E-33 |

5. A lens system as set forth in claim 4 wherein each of said thin, highly deformed plates is formed of germanium.

6. A lens system as set forth in claim 2 and having the characteristics set forth below:

THREE ELEMENT F/1.4

FOCAL LENGTH — 21

Separation of Surfaces

| | |
|---|---|
| 1 - 2 | 0.7000 |
| 2 - 3 | 5.1321 |
| 3 - 5 | 3.5488 |
| 5 - 6 | 0.7000 |
| 6 - 7 | 6.7095 |
| 7 - 8 | 0.7000 |
| 8 - 9 | 12.7939 |

SURFACE 1 POLYNOMIAL COEFFICIENTS

| COEFFICIENT | VLAUE |
|---|---|
| A1 | 0.411090E-01 |
| A2 | 0.884367E-04 |

| | |
|---|---|
| A3 | 0.155710E-05 |
| A4 | -0.155574E-07 |
| A5 | 0.200970E-09 |
| A6 | -0.165759E-12 |
| A7 | 0.396938E-15 |
| A8 | 0.228560E-16 |

SURFACE 2 POLYNOMIAL COEFFICIENTS

| COEFFICIENT | VALUE |
|---|---|
| A1 | 0.399009E-01 |
| A2 | 0.929605E-04 |
| A3 | 0.164568E-05 |
| A4 | -0.125073E-07 |
| A5 | 0.595141E-10 |
| A6 | 0.204541E-11 |
| A7 | -0.200361E-14 |
| A8 | -0.837223E-16 |

SURFACE 5 POLYNOMIAL COEFFICIENTS

| COEFFICIENT | VALUE |
|---|---|
| A1 | 0.356314E-02 |
| A2 | -0.199684E-03 |
| A3 | -0.232003E-05 |
| A4 | -0.132235E-07 |
| A5 | 0.121303E-09 |
| A6 | -0.211221E-11 |
| A7 | 0.113899E-13 |
| A8 | 0.267223E-15 |

SURFACE 6 POLYNOMIAL COEFFICIENTS

| COEFFICIENT | VALUE |
|---|---|
| A1 | 0.143848E-02 |
| A2 | -0.195107E-03 |
| A3 | -0.200231E-05 |
| A4 | -0.147829E-07 |
| A5 | 0.343119E-09 |
| A6 | -0.296525E-11 |
| A7 | -0.334305E-14 |
| A8 | 0.276317E-15 |

SURFACE 7 POLYNOMIAL COEFFICIENTS

| COEFFICIENT | VALUE |
|---|---|
| A1 | -0.569086E-02 |
| A2 | -0.195660E-05 |
| A3 | -0.213327E-06 |
| A4 | -0.679279E-08 |
| A5 | 0.487378E-10 |
| A6 | -0.834506E-13 |
| A7 | 0.303122E-16 |
| A8 | 0.362109E-18 |

SURFACE 8 POLYNOMIAL COEFFICIENTS

| COEFFICIENT | VALUE |
|---|---|
| A1 | -0.110872E-01 |
| A2 | -0.187462E-05 |
| A3 | -0.785190E-07 |
| A4 | -0.977145E-08 |
| A5 | 0.899649E-10 |
| A6 | -0.420130E-12 |
| A7 | 0.972552E-15 |
| A8 | 0.554971E-18 |

SURFACE 9 POLYNOMIAL COEFFICIENTS

| COEFFICIENT | VALUE |
|---|---|
| A1 | -0.702481E-02 |
| A2 | 0.232735E-04 |
| A3 | 0.114231E-06 |
| A4 | -0.116914E-08 |
| A5 | 0.243000E-11 |
| A6 | -0.119558E-21 |
| A7 | -0.224327E-25 |
| A8 | -0.461293E-29 |

7. A lens system as set forth in claim 6 wherein each of said thin, highly performed plates is formed of germanium.

8. A lens system as set forth in claim 2 and having substantially the characteristics set forth below:

FOUR ELEMENT F/2

FOCAL LENGTH — 29.96

| Specification of Surfaces | |
|---|---|
| 1 - 2 | 1.4988 |
| 2 - 3 | 4.1988 |
| 3 - 4 | .75500 |
| 4 - 5 | 1.4082 |
| 5 - 7 | 4.3556 |
| 7 - 8 | .7500 |
| 8 - 9 | 3.6340 |
| 9 - 10 | .9284 |
| 10 - 11 | 20.2337 |

SURFACE 1 POLYNOMIAL COEFFICIENTS

| COEFFICIENT | VALUE |
|---|---|
| A1 | 0.355365E-01 |
| A2 | 0.420445E-04 |
| A3 | 0.168923E-06 |
| A4 | -0.286201E-09 |
| A5 | 0.645338E-12 |
| A6 | 0.378137E-13 |
| A7 | -0.119481E-15 |
| A8 | 0.780458E-19 |

SURFACE 2 POLYNOMIAL COEFFICIENTS

| COEFFICIENT | VALUE |
|---|---|
| A1 | 0.341975E-01 |
| A2 | 0.257645E-04 |
| A3 | 0.930704E-07 |
| A4 | -0.139757E-08 |
| A5 | -0.117934E-11 |
| A6 | 0.581170E-13 |
| A7 | -0.163186E-15 |
| A8 | 0.234293E-19 |

SURFACE 3 POLYNOMIAL COEFFICIENTS

| COEFFICIENT | VALUE |
|---|---|
| A1 | 0.255292E-01 |
| A2 | -0.171074E-03 |
| A3 | 0.569595E-06 |
| A4 | 0.255640E-08 |
| A5 | 0.355440E-09 |
| A6 | -0.283933E-11 |
| A7 | -0.262940E-14 |
| A8 | -0.621752E-25 |

SURFACE 4 POLYNOMIAL COEFFICIENTS

| COEFFICIENT | VALUE |
|---|---|
| A1 | 0.287570E-01 |
| A2 | -0.157728E-03 |
| A3 | 0.125510E-05 |
| A4 | -0.375666E-08 |
| A5 | 0.576370E-09 |
| A6 | -0.429021E-11 |
| A7 | 0.106100E-13 |
| A8 | 0.208415E-21 |

SURFACE 7 POLYNOMIAL COEFFICIENTS

| COEFFICIENT | VALUE |
|---|---|
| A1 | -0.252638E-01 |
| A2 | 0.162717E-04 |
| A3 | 0.163854E-05 |
| A4 | 0.247747E-08 |
| A5 | -0.159428E-09 |
| A6 | -0.582616E-12 |
| A7 | 0.673413E-14 |
| A8 | -0.174029E-21 |

SURFACE 8 POLYNOMIAL COEFFICIENTS

| COEFFICIENT | VALUE |
|---|---|
| A1 | -0.263793E-01 |
| A2 | 0.276853E-04 |
| A3 | 0.135613E-05 |
| A4 | 0.401450E-08 |
| A5 | -0.130612E-09 |
| A6 | -0.100572E-11 |
| A7 | 0.818610E-14 |
| A8 | -0.305970E-22 |

SURFACE 9 POLYNOMIAL COEFFICIENTS

| COEFFICIENT | VALUE |
|---|---|
| A1 | -0.299933E-01 |
| A2 | 0.671354E-04 |
| A3 | 0.337496E-06 |
| A4 | 0.197999E-09 |
| A5 | -0.657601E-11 |
| A6 | 0.880695E-13 |
| A7 | -0.698222E-16 |
| A8 | -0.487924E-21 |

SURFACE 10 POLYNOMIAL COEFFICIENTS

| COEFFICIENT | VALUE |
|---|---|
| A1 | -0.320354E-01 |
| A2 | 0.377797E-04 |
| A3 | 0.253731E-06 |

| | |
|---|---|
| A4 | 0.112947E-08 |
| A5 | −0.678897E-11 |
| A6 | 0.111059E-12 |
| A7 | −0.952922E-16 |
| A8 | −0.243308E-19 |

9. A lens system as set forth in claim 8 wherein each of said thin, highly deformed plates is formed of germanium.

10. A lens system as set forth in claim 2 and having substantially the characteristics set forth below:

FOUR ELEMENT F/1.4

FOCAL LENGTH — 21

| Separation of Surfaces | |
|---|---|
| 1 − 2 | 0.7000 |
| 2 − 3 | 5.6652 |
| 3 − 4 | 0.7000 |
| 4 − 5 | 3.0212 |
| 5 − 7 | 5.4229 |
| 7 − 8 | 0.7000 |
| 8 − 9 | 3.6422 |
| 9 − 10 | 0.7000 |
| 10 − 11 | 10.1289 |

SURFACE 1 POLYNOMIAL COEFFICIENTS

| COEFFICIENT | VALUE |
|---|---|
| A1 | 0.377556E-01 |
| A2 | 0.711727E-04 |
| A3 | 0.280455E-06 |
| A4 | 0.149597E-08 |
| A5 | 0.962967E-12 |
| A6 | 0.521991E-16 |
| A7 | 0.828657E-19 |
| A8 | 0.136033E-21 |

SURFACE 2 POLYNOMIAL COEFFICIENTS

| COEFFICIENT | VALUE |
|---|---|
| A1 | 0.374387E-01 |
| A2 | 0.781662E-04 |
| A3 | 0.349475E-06 |
| A4 | 0.173574E-08 |
| A5 | 0.159310E-11 |
| A6 | 0.623530E-15 |
| A7 | 0.162835E-17 |
| A8 | 0.439743E-20 |

SURFACE 3 POLYNOMIAL COEFFICIENTS

| COEFFICIENT | VALUE |
|---|---|
| A1 | 0.183013E-01 |
| A2 | 0.307204E-04 |
| A3 | 0.357654E-06 |
| A4 | 0.896277E-09 |
| A5 | −0.642890E-11 |
| A6 | 0.366249E-17 |
| A7 | 0.395015E-20 |
| A8 | 0.440564E-23 |

SURFACE 4 POLYNOMIAL COEFFICIENTS

| COEFFICIENT | VALUE |
|---|---|
| A1 | 0.147581E-01 |
| A2 | 0.255754E-04 |
| A3 | 0.383079E-06 |
| A4 | 0.303876E-09 |
| A5 | −0.784487E-11 |
| A6 | 0.374745E-19 |
| A7 | 0.168747E-22 |
| A8 | 0.785769E-26 |

SURFACE 7 POLYNOMIAL COEFFICIENTS

| COEFFICIENT | VALUE |
|---|---|
| A1 | −0.320269E-02 |
| A2 | −0.297869E-03 |
| A3 | −0.697876E-06 |
| A4 | −0.184290E-07 |
| A5 | 0.439903E-11 |
| A6 | −0.541794E-20 |
| A7 | −0.221678E-23 |
| A8 | −0.937927E-27 |

SURFACE 8 POLYNOMIAL COEFFICIENTS

| COEFFICIENT | VALUE |
|---|---|
| A1 | −0.405323E-02 |
| A2 | −0.282454E-03 |
| A3 | −0.528827E-06 |
| A4 | −0.970396E-08 |
| A5 | 0.703710E-11 |
| A6 | 0.163886E-19 |
| A7 | −0.801069E-23 |
| A8 | 0.404909E-26 |

SURFACE 9 POLYNOMIAL COEFFICIENTS

| COEFFICIENT | VALUE |
|---|---|
| A1 | −0.115893E-01 |
| A2 | −0.201608E-04 |
| A3 | 0.386288E-06 |
| A4 | −0.400963E-09 |
| A5 | −0.193264E-11 |
| A6 | −0.734308E-18 |
| A7 | −0.629236E-21 |
| A8 | −0.557581E-24 |

SURFACE 10 POLYNOMIAL COEFFICIENTS

| COEFFICIENT | VALUE |
|---|---|
| A1 | −0.160620E-01 |
| A2 | −0.144057E-04 |
| A3 | 0.407039E-06 |
| A4 | −0.475656E-09 |
| A5 | −0.157049E-11 |
| A6 | 0.142395E-21 |
| A7 | −0.206846E-25 |
| A8 | −0.310714E-29 |

SURFACE 11 POLYNOMIAL COEFFICIENTS

| COEFFICIENT | VALUE |
|---|---|
| A1 | −0.738193E-02 |
| A2 | 0.369482E-04 |
| A3 | −0.124971E-06 |
| A4 | 0.240754E-09 |
| A5 | −0.877590E-18 |
| A6 | −0.142271E-21 |
| A7 | −0.241626E-25 |
| A8 | −0.424356E-29 |

11. A lens system as set forth in claim 10 wherein each of said thin, highly deformed plates is formed of germanium.

* * * * *